United States Patent
Comstock et al.

[19]

[11] Patent Number: 6,084,743
[45] Date of Patent: *Jul. 4, 2000

[54] MAGNETIC RECORDER APPARATUS WITH REDUCED DEBRIS ACCUMLATION ON THE RECORDER HEAD AND SLIDER

[75] Inventors: R. Larry Comstock, San Jose; Naum V. Gitis; Robert L. Smith, both of Cupertino, all of Calif.

[73] Assignee: Maxtor Corporation, Longmont, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/161,234

[22] Filed: Dec. 2, 1993

Related U.S. Application Data

[63] Continuation-in-part of application No. 07/992,270, Dec. 14, 1992, abandoned.

[51] Int. Cl.[7] .............................. G11B 5/60; G11B 21/21; G11B 33/14
[52] U.S. Cl. ......................................... 360/97.02; 360/103
[58] Field of Search .................................... 360/102, 103, 360/104, 97.02

[56] References Cited

U.S. PATENT DOCUMENTS

| | | | |
|---|---|---|---|
| 4,644,641 | 2/1987 | Verdone | 360/103 |
| 4,700,248 | 10/1987 | Coughlin et al. | 360/102 |
| 4,709,284 | 11/1987 | Endo et al. | 360/103 |
| 4,757,402 | 7/1988 | Mo | 360/103 |
| 4,870,619 | 9/1989 | Van Ness | 365/208 |
| 4,926,274 | 5/1990 | Saitoh et al. | 360/102 |
| 4,939,603 | 7/1990 | Inumochi | 360/103 |
| 4,961,121 | 10/1990 | Astheimer et al. | 360/103 |
| 5,041,932 | 8/1991 | Hamilton | 360/104 |
| 5,063,712 | 11/1991 | Hamilton et al. | 451/173 |
| 5,111,351 | 5/1992 | Hamilton | 360/104 |
| 5,175,658 | 12/1992 | Chang et al. | 360/103 |
| 5,198,934 | 3/1993 | Kubo et al. | 360/103 |

FOREIGN PATENT DOCUMENTS

| | | | |
|---|---|---|---|
| 61-206917 | 9/1986 | Japan | 360/103 |
| 1199364 | 8/1989 | Japan . | |
| 1-298585 | 12/1989 | Japan . | |
| 2-239420 | 9/1990 | Japan | 360/103 |
| 2-244419 | 9/1990 | Japan . | |
| 3-214478 | 9/1991 | Japan | 360/103 |
| 4-76874 | 3/1992 | Japan | 360/103 |

*Primary Examiner*—David L. Ometz
*Attorney, Agent, or Firm*—David M. Sigmond

[57] ABSTRACT

A common cause for catastrophic failure in a magnetic disk storage system is due to the collection of debris on the slider/head assembly. Two factors contributing to these failures are:

a) disk liquid lubricant provides a sticky medium for debris accumulation; and b) electrostatic charge on the slider assembly generated by friction attracts and accumulates debris.

A method for reducing electrostatic charge build-up uses a conductive coating on a surface area of the slider. By providing a conducting path to the metallic disk on which the recording medium is applied, the triboelectrically generated charge on the slider is allowed to bleed-off.

Providing an additional overcoat of a solid self-lubricant, and forming a wedge-shaped slider load-bearing surface for deflection of surface debris, results in the reduction of both failure causes.

11 Claims, 3 Drawing Sheets

MAGNETIC RECORDER APPARATUS WITH REDUCED DEBRIS ACCUMLATION ON THE RECORDER HEAD AND SLIDER

CROSS-REFERENCE TO RELATED APPLICATIONS

This application is a continuation-in-part of U.S. application Ser. No. 07/992,270, filed Dec. 14, 1992 (abandoned).

BACKGROUND OF THE INVENTION

1. Field of the Invention

This invention relates to the fields of magnetic recording and tribology. More specifically, this invention relates to the design of magnetic recording heads and sliders used in contact and near-contact recording systems and for the reduction of static charges that cause the accumulation of debris on the head and slider mechanisms.

2. Background of the Invention

Researchers working in the magnetic recording industry have recently begun focusing their effort on developing thin film heads having so-called integrated head/flexure/conductor structure for reading and writing of information to a disk medium. For example, such a magnetic head structure is disclosed in U.S. Pat. No. 5,041,932. In this type of recording technology, a magnetic pole element is embedded within the body of the magnetic recording head. Advanced performance is achieved in these types of magnetic recording heads by including a contact pad region which is in non-catastrophic, continuous sliding contact with the surface of the recording medium. The contact pad includes a working surface portion which is extremely small—on the order of about 20×30 µm. The working surface portion of the contact pad actually touches the disk during normal operation.

One of the problems associated with recording heads which are in contact with the recording medium is that a substantial amount of debris is generated by the sliding action of the head against the surface of the disk. As well as being a direct result of slider-disk micro-interactions, dust and dirt from both the environment and the drive can also accumulate on and around the contact pad region. Eventually, this particulate matter finds its way into the interface between the contact pad and the disk, leading to adverse effects such as signal modulation caused by particle induced fluctuations in the head-disk spacing, and increased wear resulting from debris entering the friction zone and scratching the working surfaces.

The problem with debris accumulation is also present in more conventional slider designs in which the head flies above the surface of the disk. By way of example, in a typical magnetic recording system, the rotation of the rigid disk causes the magnetic head or slider to become aerodynamically lifted above the surface of the recording medium. This aerodynamic lifting phenomena results from the flow of air produced by the rotating magnetic disk; it is this air flow which causes the head to "fly" above the disk surface with the magnetic transducer in near-contact with the recording medium. Of course, when the rotation of the magnetic disk slows or stops, the head element is deprived of its buoyancy and it lands on the surface of the disk. Repeated starting or stopping of the disk causes the recording head to be dragged across the surface of the disk over and over again during the "take-off" and the "landing" phases of its flight.

The current trend in the industry is toward increasing the magnetic signal by lowering the slider flying height. In the conventional type of magnetic recording head described above, this means that the separation between the head and the disk is radically reduced. For instance, very low flying heights on the order of 1 to 3 microinches are becoming increasingly common. Obviously, reducing the separation between the head and the disk medium results in increased abrasive wear. Thus, in both the near-contact (flying low, e.g., at 1 to 3 microinches) and the in-contact types of recording systems, debris accumulation is a significant problem.

It should be understood that in the conventional type of magnetic recording head which flies above the surface of the disk, the working surface which touches the disk normally comprises two or more rails having flat bottom surfaces. For example, sliders of this type are disclosed in U.S. Pat. Nos. 4,870,619; 4,961,121; 4,926,274; and 4,709,284. To increase the aerodynamic lifting force, many sliders have a front taper as described in U.S. Pat. No. 4,939,603. Other designs include a sloping working surface. In either case, the taper and/or slope are in a direction that is away from the disk surface. Other prior art designs include the so-called slider camber and crown—characterized by slopes that are away from the disk surface in the direction of relative disk to slider travel direction and also in the radial direction (at right angles to slider relative travel direction). This latter type of design is usually selected based on considerations of smaller contact area so as to reduce the problem of stiction. The drawbacks to these designs however include the requirement for a higher take off velocity and an increased wear rate.

A serious problem for all prior art magnetic recording systems is the accumulation of debris on the head and slider mechanisms due to two main causes:

1) use of a liquid lubricant on the recording surface acts as a "sticky" substance that accumulates large agglomerates that get transferred to the recorder head; and 2) electrostatic charge build-up on the head and slider due to triboelectric affects also accumulates debris.

The former problem has been addressed recently by N. Gitis and V. Dunn in a patent application entitled "Magnetic Head Slider with Resistance to Debris Accumulation," filed Dec. 14, 1992, Ser. No. 07/992,270, and N. Gitis in a patent application entitled, "Slider for Magnetic Recording Head Having Self-Lubricating Overcoat," filed Oct. 6, 1992, Ser. No. 07/957,423.

The latter problem has not been effectively addressed and is the subject of the current invention.

SUMMARY AND OBJECTS OF THE INVENTION

A magnetic disk recording system has a conductive coating applied to the surface of a slider/head assembly for conducting away any static electrified charge that may accumulate due to the triboelectric effects produced by contact between the disk recording surface and the dielectric material of the slider/head assembly and thereby reducing the propensity of the slider/head assembly to accumulate disk surface and environmental debris leading to deteriorated performance or even total failure due to a damaged recording surface.

BRIEF DESCRIPTION OF THE DRAWINGS

The present invention is illustrated by way of example and not limitation in the figures of the accompanying drawings in which like references indicate like elements and in which.

DETAILED DESCRIPTION

A magnetic recording apparatus is described with improved (reduced) propensity for accumulating debris at and about the slider/head assembly due to the build-up of static charge resulting from triboelectric charges caused by friction between the slider/head assembly and the recording surface.

In the following description, numerous specific details are set forth (such as material types, shapes, etc.) in order to provide a thorough understanding of the invention. However, it will be obvious to one of ordinary skill in the area that the invention may be practiced without these specific details. In other cases, well-known elements have not been shown in particular detail in order to avoid unnecessarily obscuring the present invention.

Figure 1:
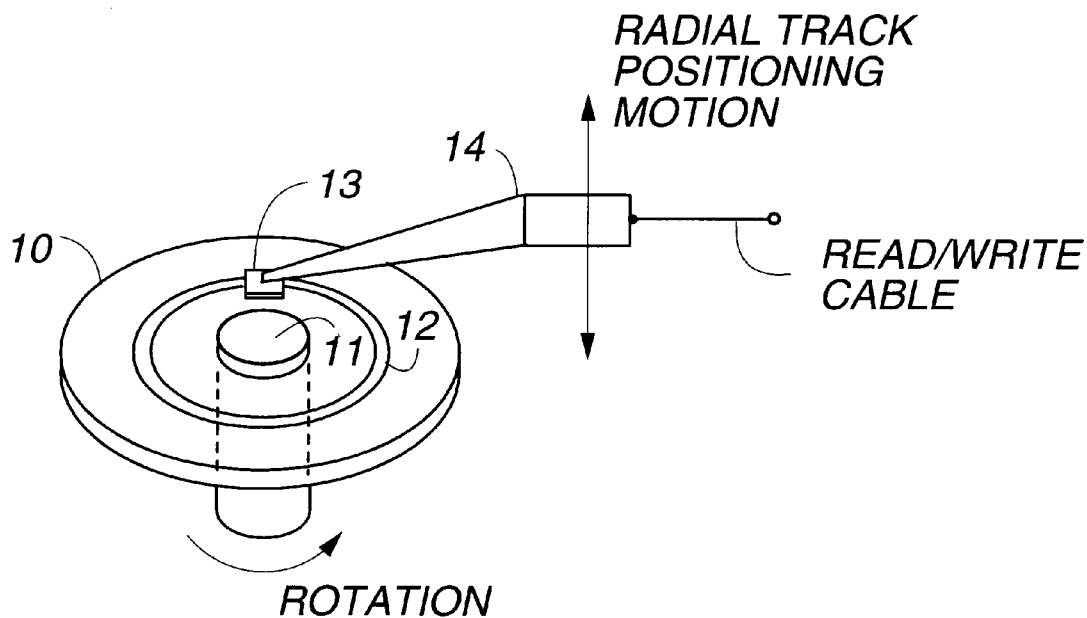
FIG. 1 is a simplified drawing of a disk memory system showing the disk, spindle, slider/head assembly, and load-beam.

FIG. 1 is a simplified drawing of the pertinent portions of a magnetic disk memory system as it relates to the present invention. Disk 10 is rotated by spindle 11 which is driven by an electrical motor (not shown) to provide uniform rotation in the range of several thousand revolutions per minute. Magnetic recording tracks 12 are recorded as circular paths by slider/head assembly 13 which is held in contact (or near-contact) with disk 10 by load-beam 14. Slider 13 may be a single or multiple track head assembly. Load-beam 14 is also used for positioning slider/head assembly 13, as indicated by the arrow showing radial positioning motion of load-beam 14.

Because slider/head assembly 13 is typically made of a non-conducting material, such as ceramic or polymer plastic, the rubbing and the friction associated with the interaction of the slider/head assembly 13 and the ceramic coating of disk 10 creates a tribological static charge on slider/head assembly 13 relative to disk 10. Because near contact operation experiences intermittent contact with the disk recording surface (due to surface variations and/or aerodynamic turbulence, for example), both contact and near-contact operations accumulate a triboelectric charge on the slider/head assembly during normal operation and also during take-off and landing.

Consequently, the accumulated charge tends to attract disk surface and environmental debris which builds up over time. The debris build-up may cause increased magnetic head transducer (gap) to disk distance thereby reducing the magnetic coupling and causing severe signal loss or it may lead to a catastrophic failure by damaging the surface of disk 10.

Figure 2:
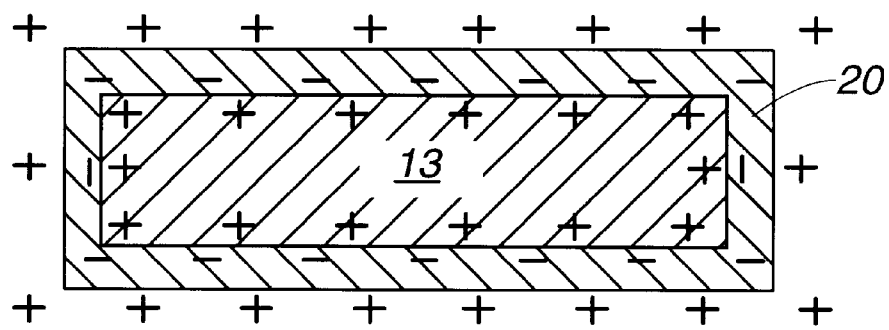
FIG. 2 shows a triboelectrically charged slider/head assembly surrounded by a conducting coat.

FIG. 2 shows an idealized slider/head assembly 13 that has been, for this example, positively charged by triboelectric phenomena. The encapsulation of the charged assembly in a conductive coating 20 causes an induced static charge in conductive coating as shown. A negative charge migrates readily towards the positively charged slider/head assembly 13, leaving a positively charged outer surface on conductive coating 20. Because of the reduced mobility of the charge in insulating materials such as used in slider/head assembly 13, the induced negative charge neutralizes the slider/head assembly positive charge over an interval of time, eventually leaving only positive charge on conductive coating 20. Because of the high mobility of charge in a conductive medium, the positive charge can be easily discharged by electrically connecting conductive coating 20 to ground or to an opposite charged body such as disk 10 of FIG. 1.

This suggests that, if the slider/head assembly can be coated with a conductive coating, it may be possible to prevent long-term static charge accumulation and the consequent collection of debris.

In the practical case, the conductive coating should not cover the magnetic recording transducer gap. Otherwise, a severe loss in magnetic coupling between the recording medium and the transducer would result because of the increased recording transducer gap to disk spacing, and also due to possible electromagnetic shielding effects.

Figure 3:
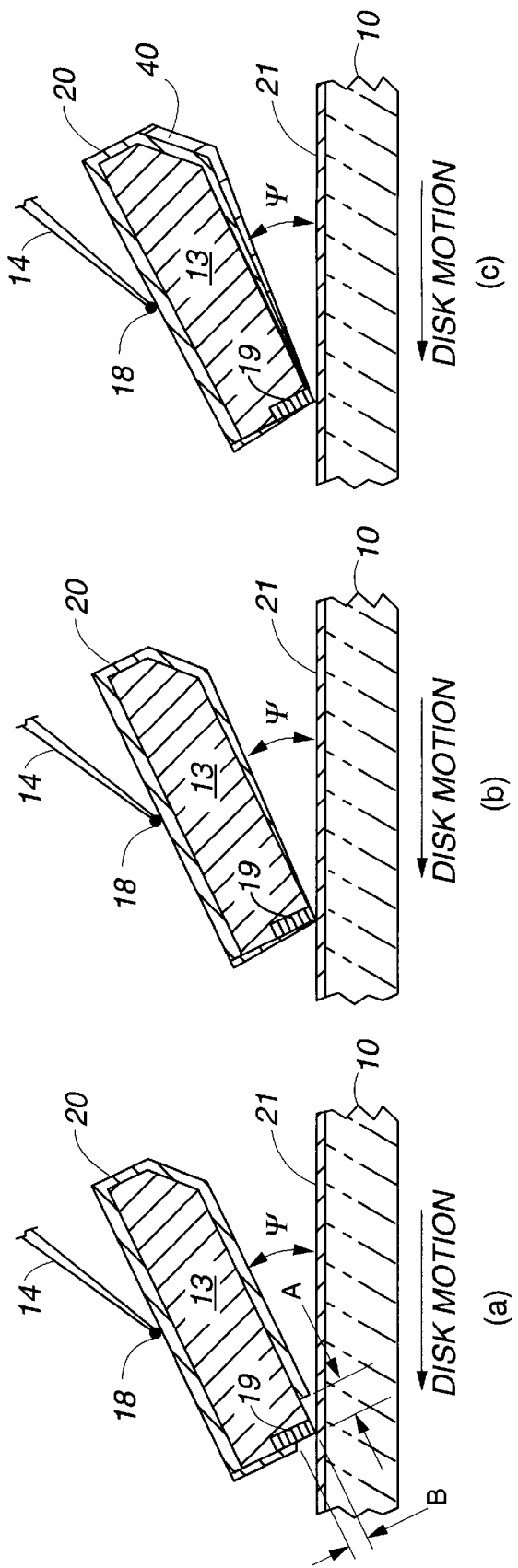
FIGS. 3a–3c show several slider/head assembly embodiments having a conductive discharge coating.

FIG. 3 shows several slider/head assembly embodiments having conductive discharge coatings. Each slider/head assembly 13 is shown having a magnetic recording transducer (head) 19 that preferably remains in contact or near-contact with the magnetic recording surface 21 of disk 10. Consequently, conductive coating 20 is applied to the surface of slider/head assembly 13 and is shown to be absent in all three examples in the vicinity of the contact (near-contact) of transducer 19 and magnetic recording surface 21. In all cases, the angle, ψ, between the slider/head assembly 13 and the recording surface 21 that results from aerodynamic forces in normal operation has been exaggerated for clarity. Although transducer 19 is shown in contact with recording surface 21, it should be recognized that, for a given slider configuration, a critical slider to disk velocity is reached at which an air film raises recording transducer 19 thus depending on the speed and the aerodynamic properties contact or near-contact operation results. Load-beam 14 is flexibly attached to the slider/head assembly at point 18.

FIG. 3(a) shows a uniformly conductive coating 20 applied to slider/head assembly 13 with a horizontal gap A and vertical gap B in the coating in the vicinity of transducer 19 for ensuring maximum transducer gap to recording surface 21 spacing.

FIG. 3(b) shows a similar structure except that the conductive coating is tapered in the vicinity of transducer 19.

FIG. 3(c) shows a slider/head assembly 13 coated with a tapered conductive coating 20 which additionally has a solid self-lubricating coating 40 applied over the lower load-bearing surface which contacts the disk when at rest or operating at very low rotational velocities. This coating is applied in order to reduce stiction at take-off and sliding friction at landing or low-speeds. In this case, the tapered coatings in the load-bearing surface allow head transducer 19 contact with recording surface 21 when angle ψ collapses to zero at rest.

Figure 4:
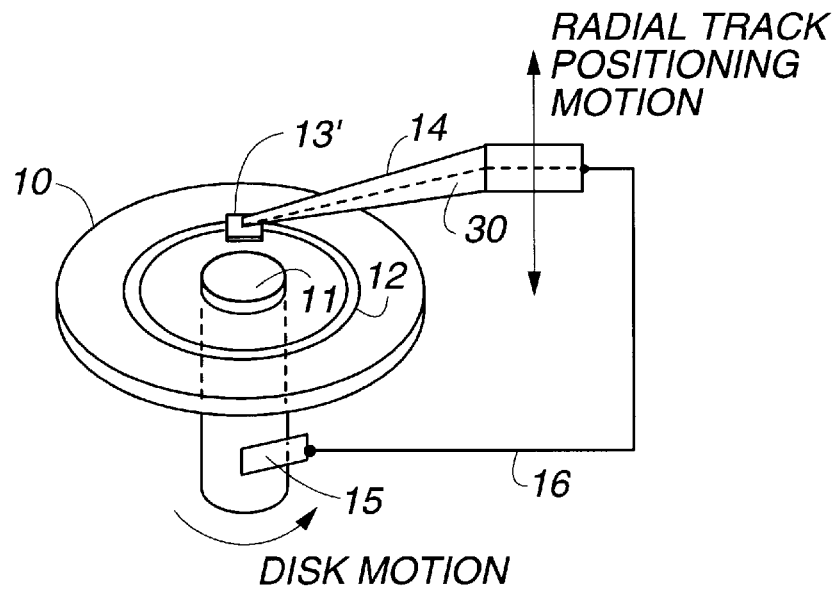
FIG. 4 is a simplified drawing of a disk memory system showing a discharge path for triboelectrically generated charges.

FIG. 4 is a simplified drawing of a disk memory system, as shown in FIG. 1, except that slider/head assembly 13' is assumed to have a conductive coating 20, load-beam 14 is assumed to have a conductive element 30 electrically connected to conductive coating 20 and discharge conductor 16 connected to brush 15 that forms a slip-ring type of contact with spindle 11 that is electrically connected to disk 10. In this manner, a discharge path is created that allows any charge accumulated by slider/head assembly 13 to discharge back through the disk to the magnetic recording surface 21.

It would be apparent to one of ordinary skill in the art that other means exist for creating a conductive path between conductive coating 20 and disk 10 or magnetic recording surface 21. For example, conductive coatings on the load-beam 14 could be connected to the metallic structure housing or supporting the disk 10 so that a conductive path is provided by the structure supporting spindle 11 and from there to disk 10. Or, a slip-ring type contact could be made directly to disk 10.

Although FIGS. 3(a), (b), and (c) show conductive coating 20 on the leading, trailing, lower load-bearing, and upper surfaces of slider/head assembly 13, it should be understood that it is not necessary that all surfaces of slider/head assembly 13 be conductively coated. Conductive coatings facilitate the discharge of the accumulated static charge by being in contact with the slider material. As the charge mobility within the slider material is increased, less conductive surface coating is required for a given level of static discharge efficiency.

In the case of contact recording, a preferred configuration may have conductive coating on the side (nonload-bearing) surfaces facing the relative motion direction of the disk where debris tends to accumulate.

Figure 5:
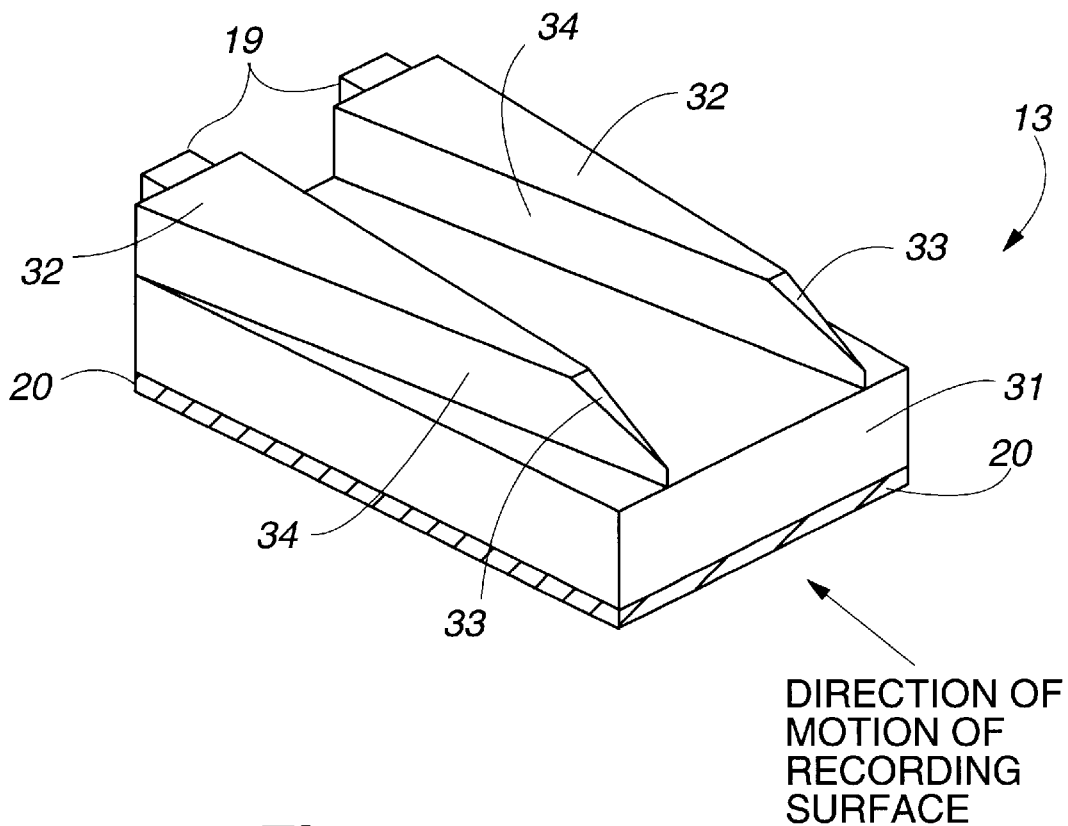
FIG. 5 is an isometric bottom view of a two-track slider/head assembly with a conductive coating and wedge-shaped rails.

FIG. 5 shows an isometric, bottom view of a two-track slider/head assembly 13 in which conductive coating 20 is combined with wedge-shaped rails 34 in order to provide the debris immunity offered by shaped rails acting as mechanical means for pushing debris away from the magnetic transducers 19 in combination with conductive coating 20 used for reduction of debris accumulation due to triboelectric static charge. Surface 31 is the leading edge of slider/head assembly 13. Surface 32 is the load-bearing surface, and surface 33 is used to assist aerodynamic lift of leading edge 31.

Although only a wedge-shaped taper rail structure is shown in FIG. 5, it should be understood that other tapering forms can be used such as described by N. Gitis et al. in application Ser. No. 07/992,270, filed Dec. 14, 1992, and incorporated herewith by reference.

This latter structure (FIG. 5) could also include a solid self-lubricating coating on the load-bearing surfaces of rails 34 for reduced stiction and sliding friction. It should be noted that although FIG. 5 is a two-track structure, the same principles apply to slider/head assemblies of one or more tracks.

Conductive material, such as carbon, gold, silver, or copper, may be applied to the slider/head assembly by various known fabrication techniques that include, but are not limited to, vapor deposition, electrochemical deposition, sputtering, or plating.

Also, alloying or adding of conductive material to non-conducting material normally used in the manufacturing of the slider can lower the resistivity of the base material so that any static charge that might be accumulated can be drained-off. Examples of such alloyed materials might include, for example, titanium alloyed with alumina.

The methods and structures for the reduction of debris accumulation described above are based on the following three principles:

1) reduction of triboelectric static charge;
2) use of solid self-lubricating rail coatings to eliminate liquid lubricants to which debris may adhere; and
3) use of rail shape to mechanically deflect debris.

The examples described for the use of these techniques are illustrative of the invention but not limiting. Other combinations of these techniques will now be obvious to one of ordinary skill in the art.

What is claimed is:

1. A magnetic disk storage system with increased reliability by the reduction of electrostatic charge accumulation on the magnetic disk storage system's slider head assembly due to tribological effects, the disk storage system comprising:

a) an electrically conductive storage disk with a magnetic recording surface that is in contact with a slider/head assembly load-bearing conductive surface when at rest, the disk rotating and in contact with or in close proximity to a slider/head assembly magnetic transducer when writing data to or reading data from the disk;
   b) the slider/head assembly including:
      i) a slider with a load-bearing surface that is in contact with the magnetic recording surface at least when the disk is at rest;
      ii) the magnetic transducer mounted in the slider for writing and reading data to and from the magnetic recording surface of the electrically conductive storage disk; and
      iii) an electrically conductive coating applied to at least one surface of the slider for facilitating the discharge of electrostatic charge on the slider, wherein the electrically conductive coating is a conducting metallic coating that is applied to the load-bearing surface with a tapered thickness, beginning in the proximity of the transducer and increasing in thickness toward the leading edge facing into the direction of disk rotation; and
   c) an electrically conducting path connected to the slider/head assembly electrically conductive coating and to the electrically conductive storage disk for discharging triboelectrically generated charge on the slider/head assembly.

2. The magnetic disk storage system of claim 1 wherein the slider load-bearing conductive surface is additionally covered by a solid self-lubricating coating for providing reduced stiction and friction between the slider load-bearing surface and the disk magnetic recording surface, and for allowing close transducer to recording surface operation.

3. The magnetic disk storage system of claim 1 wherein the electrically conductive path is a conductive coating, at least in part.

4. A magnetic disk storage system with increased reliability by the reduction of electrostatic charge accumulation on the magnetic disk storage system's slider head assembly due to tribological effects, the disk storage system comprising:

a) an electrically conductive storage disk with a magnetic recording surface that is in contact with a slider/head assembly load-bearing conductive surface when at rest, the disk rotating and in contact with or in close proximity to a slider/head assembly magnetic transducer when writing data to or reading data from the disk;
   b) the slider/head assembly including:
      i) a slider with a load-bearing surface that is in contact with the magnetic recording surface at least when the disk is at rest, wherein the load-bearing surface is tapered with its narrow end facing into the relative motion of the magnetic recording disk for the deflection of magnetic disk surface debris;
      ii) the magnetic transducer mounted in the slider for writing and reading data to and from the magnetic recording surface of the electrically conductive storage disk; and iii) an electrically conductive coating applied to at least one surface of the slider for facilitating the discharge of electrostatic charge on the slider; and c) an electrically conducting path connected to the slider/head assembly electrically conductive coating and to the electrically conductive storage disk for discharging triboelectrically generated charge on the slider/head assembly.

5. The magnetic disk storage system of claim 4 wherein the tapered surface has a uniform taper.

6. A method for reducing debris accumulation in a magnetic disk storage system comprising a disk having an electrically conductive base with a magnetic recording surface, and a slider/head assembly including a magnetic transducer in close proximity to the magnetic recording surface when writing data to or reading data from the disk and having a load-bearing surface in contact with the magnetic recording surface when the disk is not rotating, the method comprising the following steps:

a) tapering the load-bearing surface with its narrow end facing into the relative motion of the magnetic recording disk for deflecting magnetic disk surface debris;

b) forming an electrically conductive surface area on the slider/head assembly except in the proximity of the magnetic transducer; and c) electrically connecting the electrically conductive surface to the electrically conducting disk base for discharging triboloelectrically generated static charges on the slider/head assembly.

7. The method of claim 6 wherein the step of forming an electrically conductive surface area results from forming the slider/head assembly from a conducting material.

8. The method of claim 6 wherein a step of forming an electrically conductive load-bearing surface results from applying a conductive coating to the load-bearing surface.

9. The method of claim 6 wherein the conductive coating is applied to the load-bearing surface except in the proximity of the magnetic transducer in order to ensure minimum transducer to magnetic recording surface distance when the disk is rotating at a normal operating velocity.

10. The method of claim 6 for reducing debris accumulation further comprising the step of applying a solid self-lubricating coating on the load-bearing surface for reducing stiction and sliding friction and the need for liquid lubricants to which surface debris tends to adhere.

11. A magnetic disk storage system with increased reliability by the reduction of electrostatic charge accumulation on the magnetic disk storage system's slider head assembly due to triboelectric effects, the disk storage system comprising:

a) an electrically conductive storage disk with a magnetic recording surface that is in contact with a slider/head assembly load-bearing conductive surface when at rest, the disk rotating and in close proximity to a slider/head assembly magnetic transducer when writing data to or reading data from the disk;

b) The slider/head assembly comprising:

i) a slider with a load-bearing surface that is in contact with the magnetic recording surface when the disk is at rest;

ii) a magnetic transducer mounted in the slider for writing and reading data to and from the magnetic recording surface of the electrically conductive storage disk; and iii) an electrically conductive coating applied to at least one surface of the slider for facilitating the discharge of electrostatic charge on the slider, the coating being having a tapered thickness beginning in the proximity of the transducer and increasing thickness toward the leading edge facing into the direction of disk rotation; and c) an electrically conducting path connected to the slider/head assembly electrically conductive coating and to the electrically conductive storage disk for discharging triboelectrically generated charge on the slider head assembly.

* * * * *